(12) United States Patent
Hale et al.

(10) Patent No.: US 6,442,853 B1
(45) Date of Patent: Sep. 3, 2002

(54) DOOR JAMB SQUARE

(75) Inventors: Frank O. Hale; Susan Hale, both of Stratham, NH (US)

(73) Assignee: Door Jamb Square, LLC, Portsmouth, NH (US)

( * ) Notice: Subject to any disclaimer, the term of this patent is extended or adjusted under 35 U.S.C. 154(b) by 22 days.

(21) Appl. No.: 09/661,649

(22) Filed: Sep. 13, 2000

(51) Int. Cl.[7] .............................. G01C 9/00; E04F 21/00
(52) U.S. Cl. .............................. 33/194; 33/365; 33/381; 33/451
(58) Field of Search .................... 33/194, 347, 365, 33/370, 371, 379, 381, 382, 451, DIG. 1

(56) References Cited

U.S. PATENT DOCUMENTS

| | | | |
|---|---|---|---|
| 1,319,545 A | 10/1919 | Weston | |
| 1,324,411 A | 12/1919 | Rosenholm | |
| 1,646,958 A | 10/1927 | Facci | |
| 2,636,282 A | 4/1953 | Kronquist | 33/194 |
| 2,748,493 A * | 6/1956 | Williams | 33/194 |
| 2,973,584 A | 4/1961 | Snapp | 33/194 |
| 3,296,708 A | 1/1967 | Moody | 33/207 |
| 3,499,225 A | 3/1970 | Darrah | 33/89 |
| 3,675,297 A * | 7/1972 | Appleton | 33/194 |
| 3,753,556 A * | 8/1973 | Nix | 33/194 |
| 4,733,475 A | 3/1988 | Youmans | 33/372 |
| 4,910,876 A | 3/1990 | Channell | 33/374 |
| 5,375,334 A * | 12/1994 | Coker | 33/194 |
| 5,396,707 A * | 3/1995 | Blase | 33/194 |
| 5,433,011 A | 7/1995 | Scarborough et al. | 33/376 |
| 5,535,523 A | 7/1996 | Endris | 33/371 |
| 5,560,112 A | 10/1996 | Stein et al. | 33/194 |
| 5,813,125 A | 9/1998 | Byrn | 33/451 |
| 6,047,478 A | 4/2000 | Sowers | 33/379 |

FOREIGN PATENT DOCUMENTS

| | | | |
|---|---|---|---|
| CA | 582618 | 9/1959 | 33/194 |
| DE | 271596 | 7/1913 | 42/23 |
| FR | 1064987 | 10/1952 | 12/3 |

* cited by examiner

*Primary Examiner*—Diego Gutierrez
*Assistant Examiner*—Travis Reis
(74) *Attorney, Agent, or Firm*—Richard C. Litman

(57) ABSTRACT

A door jamb square made of two extensions, a vertical extension and a horizontal extension. Both extensions are provided with bubble spirit levels and are attached forming a right angle, that can be fit into the corner of a door jamb to square that door jamb. The door jamb square is secured to the door jamb using a nailing plate, web plate and a bolt. The web plate is placed within the webbing of the door jamb square, covered by the nailing plate. The web plate and nailing plate each have an aperture aligned and fitted with the bolt. Additional sheetrock screws are used to secure the other side of the nailing plate and door jamb assembly to the door jamb.

4 Claims, 7 Drawing Sheets

DOOR JAMB SQUARE

BACKGROUND OF THE INVENTION

1. Field of the Invention

The present invention relates to door jamb aligning tools and, more particularly, to a door jamb square used to align door jambs.

2. Description of the Related Art

Building construction involves precise measurements and calculations in order for a structure to be properly built. One mistake or miscalculation can be magnified many times over and can result in the redoing and recalculation of substandard work. No construction feature requires more precision and accuracy than setting door jambs.

The related art describes many devices that can be used to properly align door jambs. U.S. Pat. No. 2,636,282 issued to Kronquist outlines the use of a doorframe setting gauge for enabling a workman to quickly and accurately set the jambs of a door frame. The gauge is an inverted L-shape gauge and is fastened to the jamb using standard finishing nails.

U.S. Pat. No. 2,973,584 issued to Snapp outlines another device that can be used to properly align door jambs. This particular device is less cumbersome to store and transport. This particular device is also adjustable for angles other then 90 degrees between the vertical portion of the device and the horizontal portion of the device.

U.S. Pat. No. 3,499,225 issued to Darrah outlines the use of an alignment and measuring square for use in the steel fabrication and erector industry. The square is provided with magnetic material along its edge to allow a user to use the magnets to hold the square in place while the door jamb is being set.

U.S. Pat. No. 4,910,876 issued to Channell outlines the use of a level attachment used with an elongated carpenter's level for forming an enlarged square, which can be better used to set a door jamb because of this additional length. The carpenter's level is firmly but temporarily secured to the attachment for easy addition and removal.

U.S. Pat. No. 5,535,523 issued to Endris outlines the use of a carpenter's square which is uniquely configured for use in commercial construction which utilizes steel framing members. More particularly, this invention relates to a carpenter's square which is adapted for use in aligning a steel wall stud relative to a steel track to which the stud is to be fastened, such that the stud can be secured squarely to the track.

U.S. Pat. No. 5,560,112 issued to Stein et al. outlines the use of a door template for cutting a door to fit in a door jamb. After adjustment, the template is removed from the jamb, laid over a door blank, and the proper door size transferred to the door blank by running a marker such as a knife or pen, along the periphery of the template. The door blank is then cut along the marked lines to form a door of proper size to fit the jamb.

U.S. Pat. No. 5,813,125 issued to Byrn outlines the use of a self-holding square and level which includes mounting holes to allow it to be mounted via screws. These holes are inserted over the protruding screws, thereby holding the leveling square in place. There are also grooves provided in the center of the square to receive a leveling device positioned in various directions.

Although some of the leveling square devices described have a self-holding feature, that self-holding feature can be improved to better secure a leveling device while it is being used to squarely set a door jamb. That's what is needed, a device that better stabilizes or secures a leveling device to a door jamb being set. With a better way of securing the leveling device to the door jamb, a more accurate and precise setting can be made.

None of the above inventions and patents, taken either singularly or in combination, is seen to describe the instant invention as claimed. Thus a door jamb square solving the aforementioned problems is desired.

SUMMARY OF THE INVENTION

The invention is a door jamb square, which was developed as a labor-saving system to allow the rapid and effective placement of door frames and other outer frames, due to its ability to square and stabilize the frames all in one procedure.

For many years, doors have been installed with the aid of a level/straight edge and framing square. The door jamb square in contrast provides ease of installing a door jamb by placing it in the rough opening all squared, while having the level and straight edge attached to the jamb with the use of nailing plates. The nailing plates extend past the jamb, which in turn will help to plumb and square the jamb flush with the wall in the rough opening. This will all be done in one easy step.

The door jamb square is made of two extensions, a vertical extension and a horizontal extension. Both extensions are provided with bubble spirit levels and are attached forming a right angle, that can be fit into the corner of a door jamb to square that door jamb. The door jamb square is secured to the door jamb using a nailing plate, web plate and a bolt. The web plate is placed within the webbing of the door jamb square, covered by the nailing plate. The web plate and nailing plate each have an aperture aligned and fitted with the bolt. Additional sheetrock screws are used to secure the other side of the nailing plate and door jamb assembly to the door jamb.

Accordingly, it is a principal object of the invention to allow the rapid and effective placement of door frames and other outer frames, all in one procedure.

It is another object of the invention to provide an improved door jamb square that better secures itself to a door jamb being aligned.

It is another object of the invention to provide a door jamb square that holds and aligns itself against a metal door jamb and is completely self-holding.

It is a further object of the invention to provide a door jamb that can be easily broken down for easy transport or storage.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
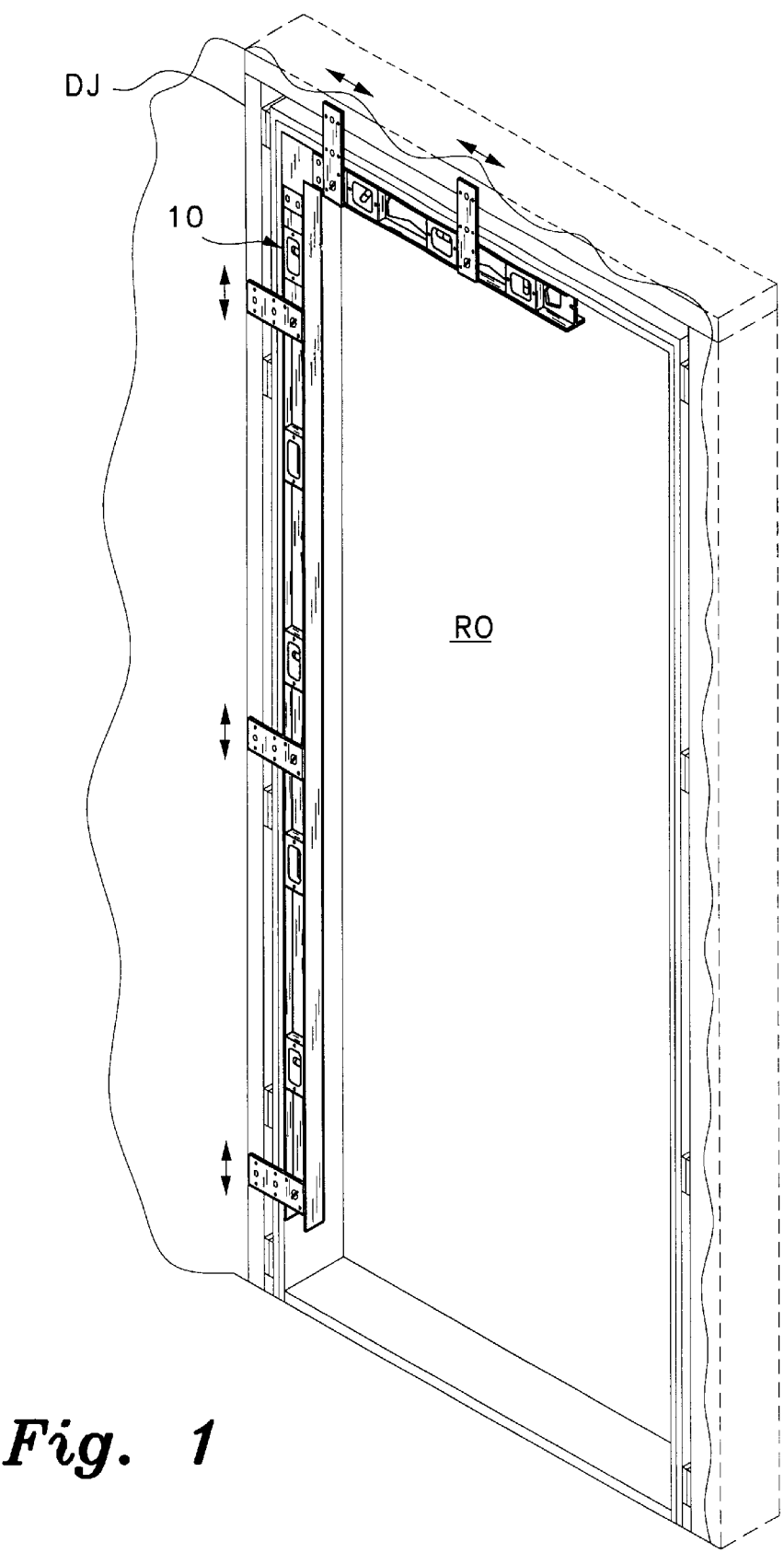
FIG. 1 is an environmental, perspective view of a first embodiment of a door jamb square according to the present invention.

The present invention is a door jamb square 10 used to align door jambs DJ, as shown in FIG. 1. The door jamb square 10 is attached to the door jamb DJ with the use of web plates 50 and nailing plates 60, making it more stabilized, level and squared when placed in a rough opening RO.

Figure 2A:
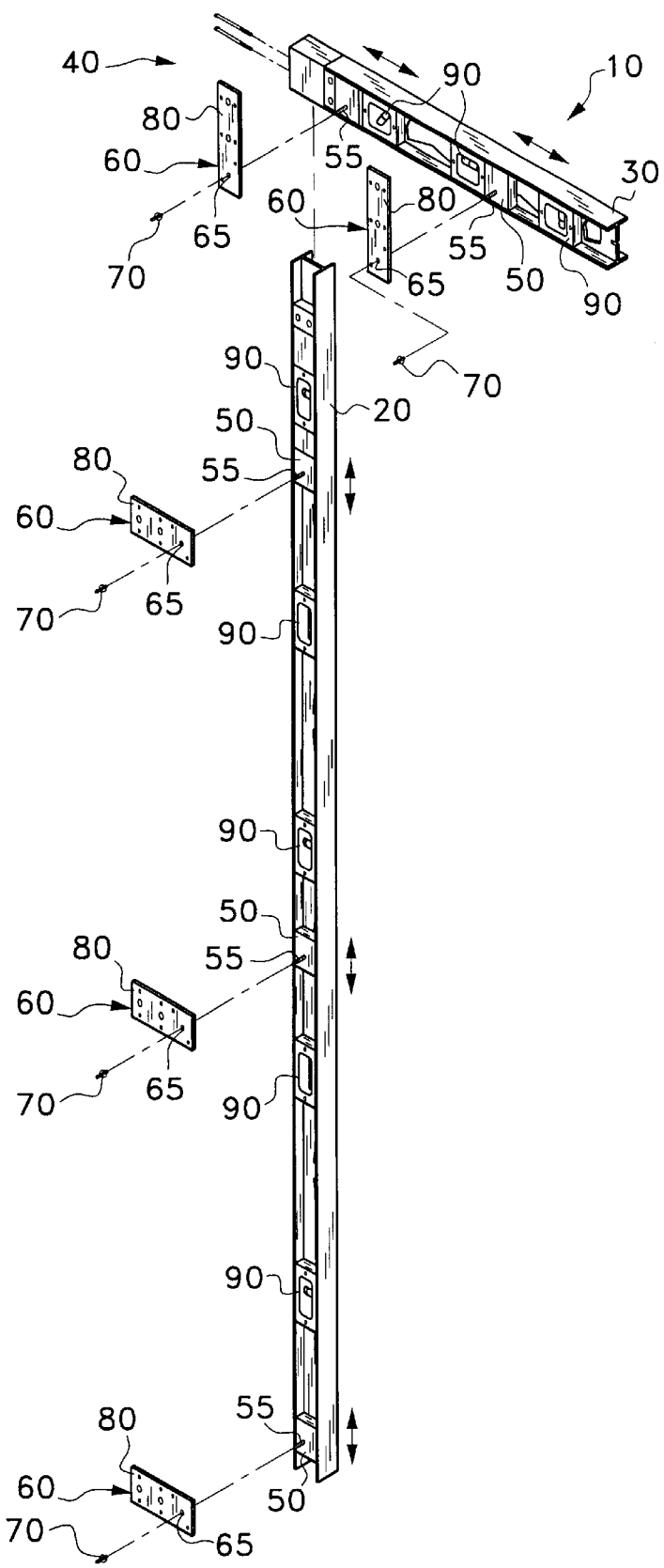
FIG. 2A is an exploded perspective view of a door jamb square according to the present invention.

The door jamb square 10 comprises a vertical spirit level 20, a horizontal spirit level 30, an attaching means for attaching one end of the vertical spirit level 20 with another end of the horizontal spirit level 30 (forming a right angle and a single spirit level assembly 40) and a securing means for securing the spirit level assembly 40 to a door jamb DJ to align the door jamb DJ. This is shown in FIG. 2A.

Several web plates 50 are inserted in the inner web 24 of the horizontal spirit level 30 and the vertical spirit level 20. A nailing plate 60 is placed over each web plate 50 and the aperture 55 on the web plate 50 is aligned with an aperture 65 on the nailing plate 60. The web plates 50 can be moved up or down the vertical spirit level 20 and horizontal spirit level 30 to accommodate different sized door jambs DJ. (sliding motion will help miss the hinges on the jamb).

When attaching the horizontal spirit level 30 and the vertical spirit level 20 to the door jamb DJ, the top and hinge sides are stable and square (with the nailing plates 60 extending past the outer edge of the door jamb DJ). A bolt 70 is inserted into the two aligned apertures 55,65 and is punched into the web plate 50, with the end of the bolt 70 protruding outward.

Figure 2B:
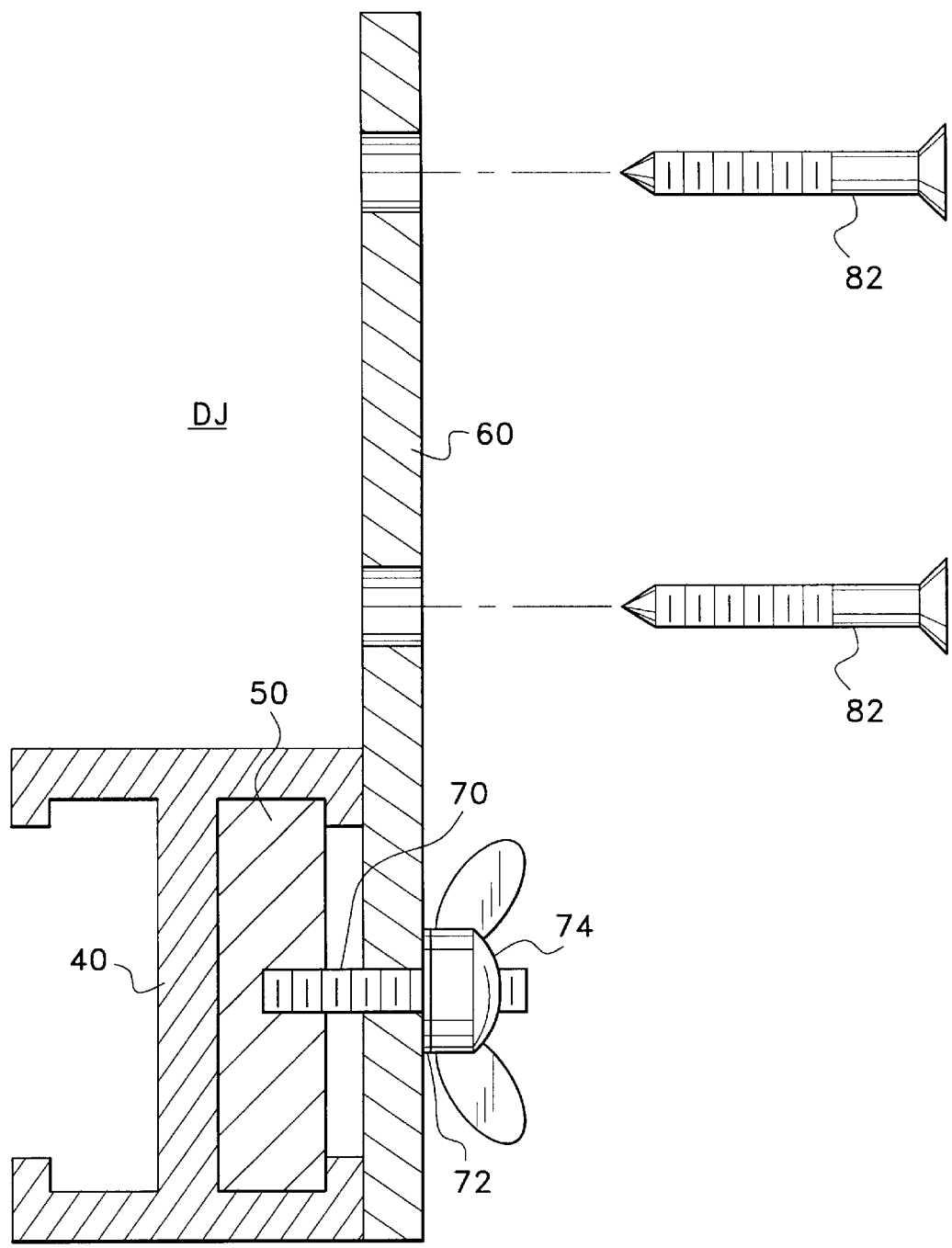
FIG. 2B is a side perspective view of the arrangement of a web plate, door jamb square, nailing plate, square shank and wing nut.

A washer 72 and wing nut 74 are placed on the protruding bolt 70 and are tightened by hand forming a single unit, as shown in FIG. 2B. Four apertures 80 on each nailing plate 60 are placed over the door jam DJ and are inserted with sheetrock screws 82 to secure the nailing plate 60 and door jamb square 10 to the door jamb DJ. The nailing plates 60 can be turned 180 degrees from their outward pointing position to accommodate left-sided and right-sided door jambs. There are also horizontal and vertical bubble sprint levels 90 distributed over the length of the spirit level assembly 40, which serve as leveling indicators for the vertical spirit level 20 and the horizontal spirit level 30.

Figure 2C:
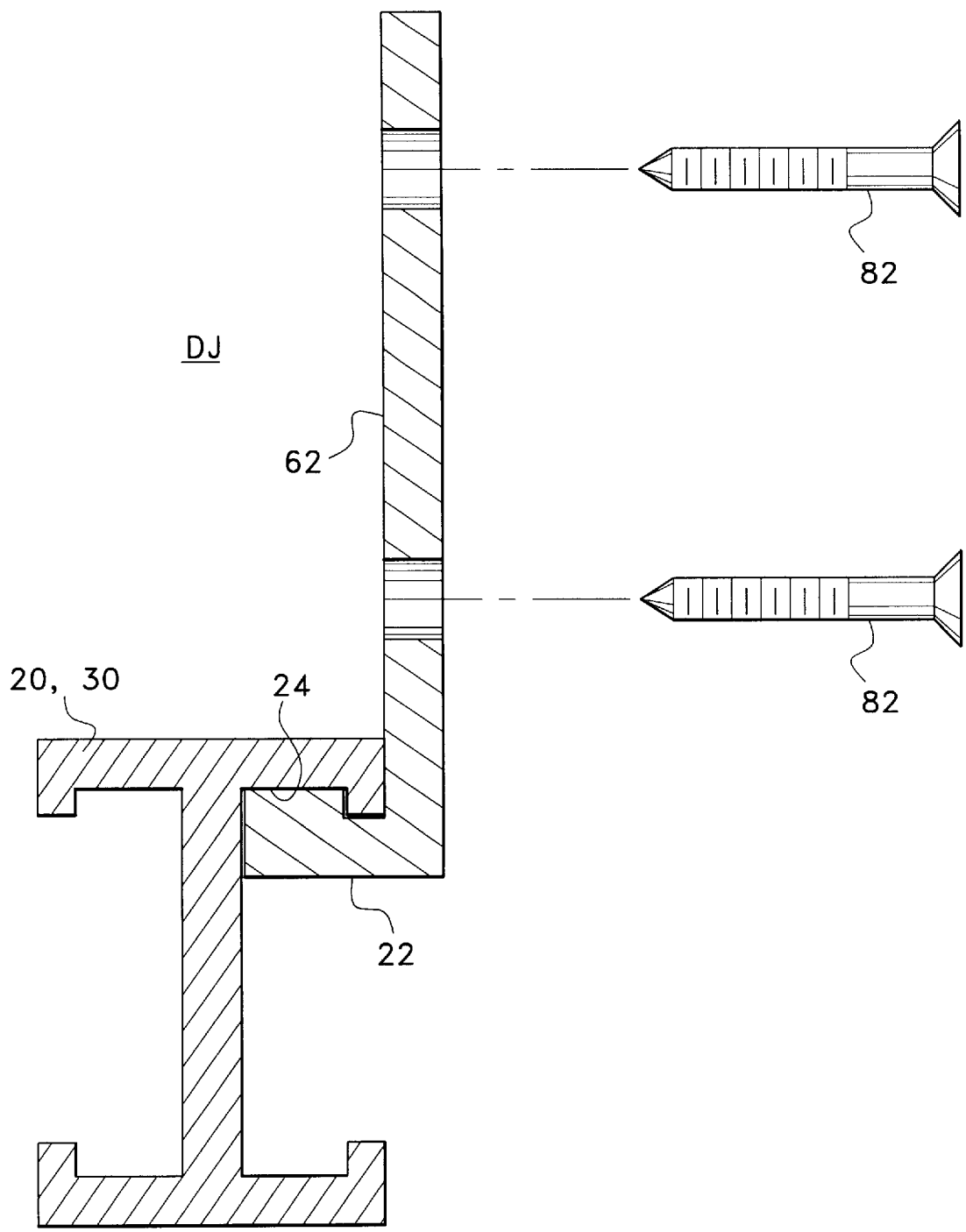
FIG. 2C is a side perspective view of the arrangement of the second type of nailing plate with hook, inner web and sheetrock screws.

FIG. 2C outlines the use of a second type of nailing plate 62. This type of nailing plate 62 has a fitted hook 22 on one end, which can be affixed into the inner web 24 of the horizontal spirit level 30 and the vertical spirit level 20. The fitted hook 22 catches the top of the inner web 24 of the horizontal spirit level 30 and the vertical spirit level 20 to secure it in place. The second type of nailing plate 62 can also be secured to the door jamb DJ with sheetrock screws 82.

Figure 3:
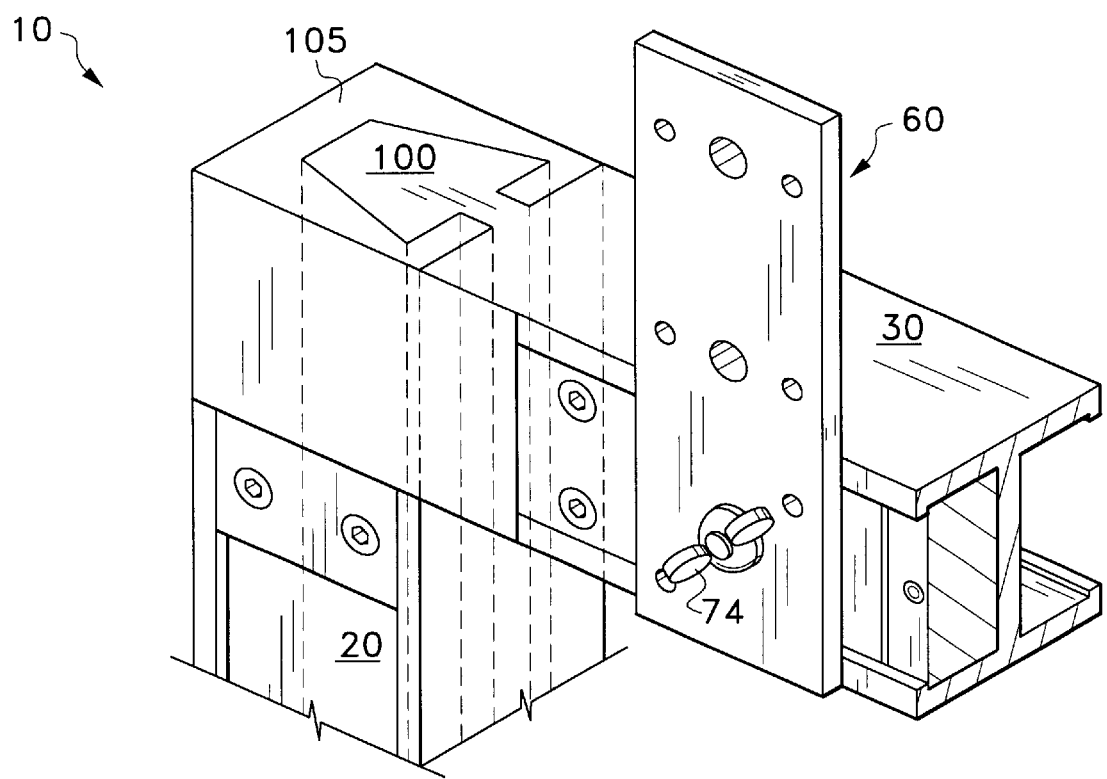
FIG. 3 is a front perspective view of a door jamb square that utilizes a slip-on wedge corner connection according to the present invention.
Figure 4:
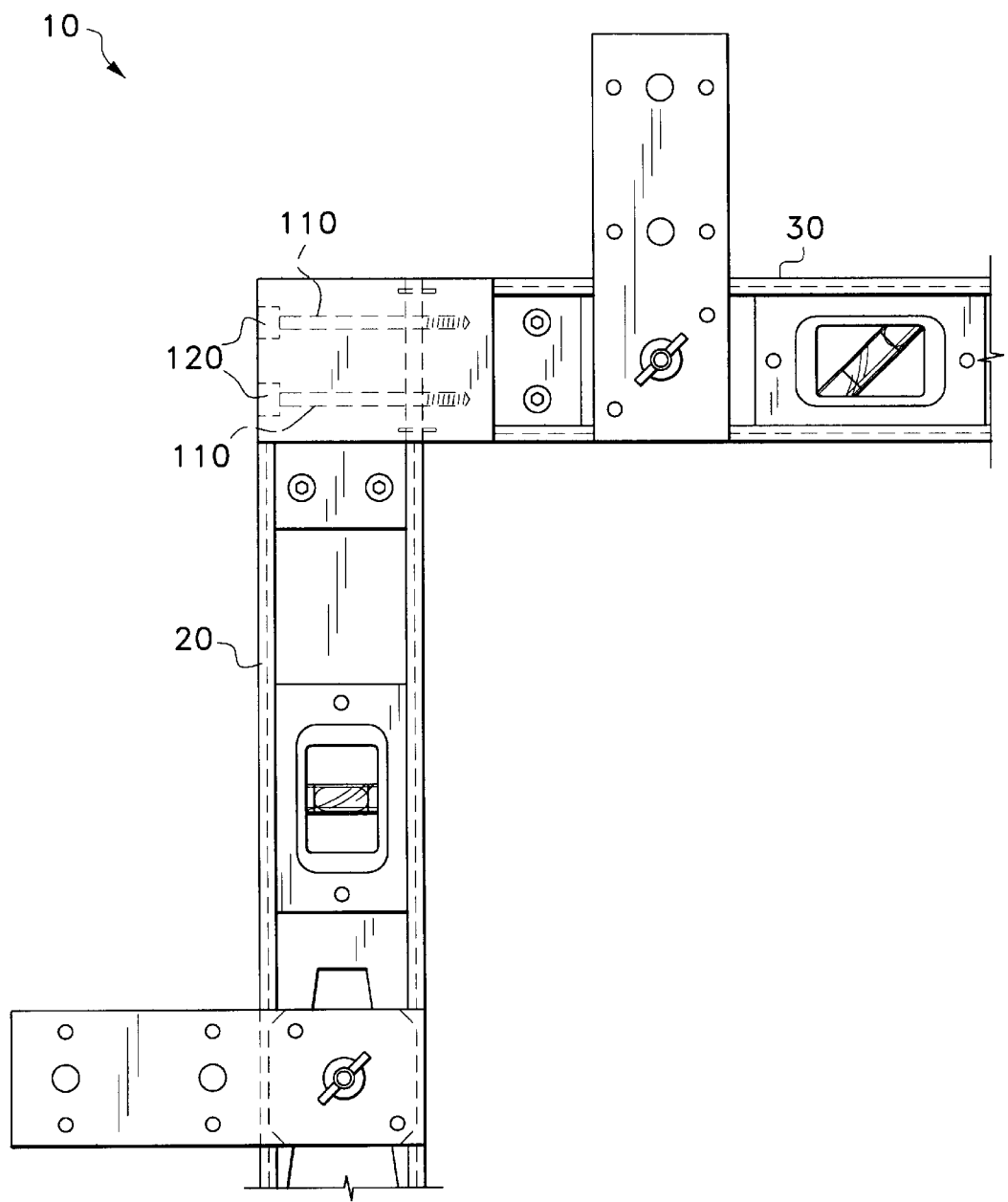
FIG. 4 is a front perspective view of a door jamb square that utilizes two metal bolts for a corner connection.

The door jamb square 10 has an attaching means for attaching one end of the vertical spirit level 20 with another end of the horizontal spirit level 30, which is a slip-on dovetail connection, as shown in FIG. 3. The dovetail 100 is on the end of the horizontal spirit level 30 and is manually slid into the fitted aperture 105 on the end of the vertical spirit level 20. There is also a second attaching means which simply consists of 2 metal bolts 110 that are inserted into the 2 apertures 120 that start from the vertical spirit level 20 and extend into the horizontal spirit level 30. The 2 metal bolts 110 can be screwed into the 2 apertures 120 using a screwdriver or screwgun (not shown). This is also illustrated in FIG. 4. Note that both attaching means can be used together at the same time for enhanced strength or each can be used separately.

Figure 5:
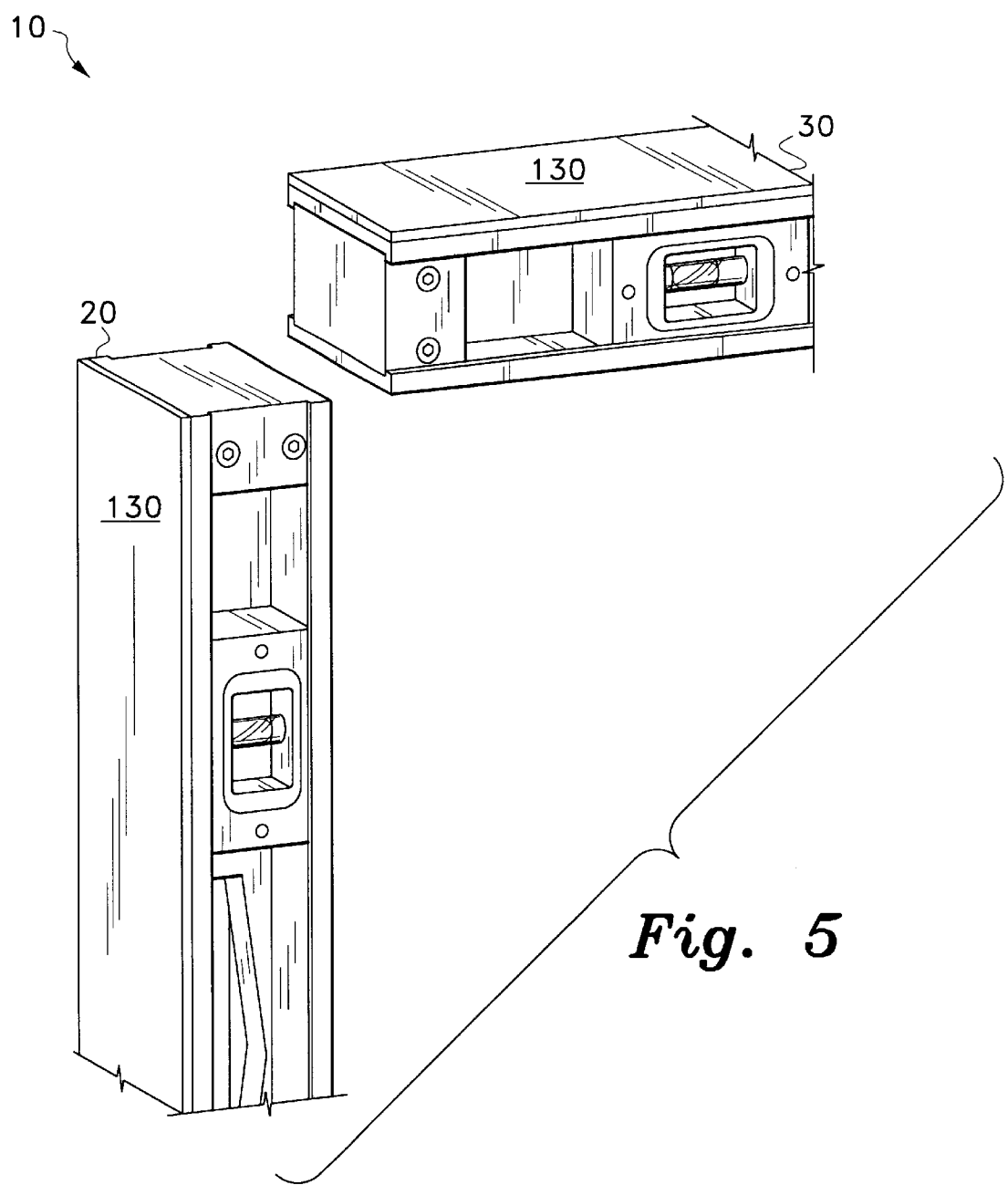
FIG. 5 is a front perspective view of a second embodiment of a door jamb square that utilizes magnetic material to hold the door jamb square in place while it is being used.

A second embodiment of the invention is illustrated in FIG. 5, where the door jamb square 10 securing means is a magnetic strip 130 provided on the outer side edge of the spirit level assembly 40. This embodiment will only work if the door jamb DJ is metal, which is often the case. The magnetic strip 130 is provided on the outer edge of both the vertical spirit level 20 and the horizontal spirit level 30 and is simply placed adjacently to any metallic door jamb DJ. The magnetic strip 130 is strong enough to hold the door jamb square 10 in place by itself and allows the user to free-up his hands to perform other functions. The use of a magnetic strip 130 to secure something in place is well-known to those schooled in the related art and is not a novel feature of this invention.

Operation and use of the door jamb square 10 is uncomplicated. The horizontal spirit level 30 is attached to the vertical spirit level 20 manually or with the use of a screwdriver or screwgun (not shown), depending on the attaching means that the user chooses to utilize. A screwdriver or screwgun is also used to attach the sheetrock screws 82 with the nailing plate 60 to the door jamb DJ as part of the securing means of this invention. The wing nut 74, washer 72 and bolt 70 are also part of the first securing means and are manually installed and disassembled. The door jamb square 10 is also made of lightweight and heavy duty aluminum for strength and easy handling.

It is to be understood that the present invention is not limited to the embodiments described above, but encompasses any and all embodiments within the scope of the following claims.

We claim:

1. A door jamb square used to align a door jamb in a door opening, said door jamb square comprising:
    a vertically oriented spirit level, said vertically oriented spirit level having a first end;
    a horizontally oriented spirit level, said horizontally oriented spirit level having a first end;
    means for perpendicularly attaching said first end of said vertically oriented spirit level to said first end of said horizontally oriented spirit level;
    a first plurality of web plates disposed in said vertically oriented spirit level, said first plurality of web plates being vertically adjustable in said vertically oriented spirit level;
    a second plurality of web plates disposed in said horizontally oriented spirit level, said second plurality of web plates being horizontally adjustable in said horizontally oriented spirit level;
    an aperture disposed in each of said first and said second plurality of web plates;
    a plurality of nailing plates;
    an opening formed through each said plurality of nailing plates;
    a plurality of removal bolts;
    each bolt of said plurality of removable bolts disposed in a respective aperture of said first and said second plurality of web plates and extended through a respective opening through each said plurality of nailing plates; and
    a wing nut received on each bolt of said plurality of removable bolts for fastening each said plurality of nailing plates to a respective one of said first and said second plurality of web plates.

2. A door jamb square as recited in claim 1, wherein said means for perpendicularly attaching is a slip-on dovetail member connecting said first end of said vertically oriented spirit level to said first end of said horizontally oriented spirit level.

3. A door jamb square as recited in claim 1, wherein said means for perpendicularly attaching include metal bolts connecting said first end of said vertically oriented spirit level to said first end of said horizontally oriented spirit level.

4. A door jamb square as recited in claim 1, wherein said means for perpendicularly attaching include magnetic strips connecting said first end of said vertically oriented spirit level to said first end of said horizontally oriented spirit level.

* * * * *